(12) United States Patent
Joplin et al.

(10) Patent No.: US 8,731,711 B1
(45) Date of Patent: May 20, 2014

(54) SYSTEMS AND METHODS FOR SORTING

(75) Inventors: Jonathan W. Joplin, Chesterfield, MO (US); Steve Hanlon, Ballwin, MO (US)

(73) Assignee: Express Scripts, Inc., St. Louis, MO (US)

( * ) Notice: Subject to any disclaimer, the term of this patent is extended or adjusted under 35 U.S.C. 154(b) by 172 days.

(21) Appl. No.: 13/411,977

(22) Filed: Mar. 5, 2012

Related U.S. Application Data

(60) Provisional application No. 61/449,523, filed on Mar. 4, 2011.

(51) Int. Cl.
*G06F 7/00* (2006.01)
(52) U.S. Cl.
USPC ........... 700/224; 700/213; 700/214; 700/216; 700/219; 700/228; 700/231; 700/323
(58) Field of Classification Search
None
See application file for complete search history.

(56) References Cited

U.S. PATENT DOCUMENTS

| | | |
|---|---|---|
| 5,990,437 A | 11/1999 | Coutant et al. |
| 6,762,382 B1 | 7/2004 | Danelski |
| 2002/0026768 A1 | 3/2002 | Duncan et al. |
| 2008/0017661 A1* | 1/2008 | Hutchinson et al. .......... 221/211 |

* cited by examiner

*Primary Examiner* — Yolanda Cumbess
(74) *Attorney, Agent, or Firm* — Husch Blackwell LLP

(57) ABSTRACT

Method and systems for sorting are described. In one embodiment, a container is released into a pocket section, with the pocket section being at a first alignment stage. The pocket section is rotated with the container away from the first alignment stage to a second alignment stage. Attributes of the container are acquired at the second alignment stage. An order to which the container belongs is identified with the acquired attributes. The pocket section with the container is rotated to a third alignment stage. The location of the third alignment stage is selected based on the identified order. The container is received to group with one or more containers in the identified order. Additional methods and systems are disclosed.

17 Claims, 13 Drawing Sheets

SYSTEMS AND METHODS FOR SORTING

CROSS-REFERENCE TO A RELATED APPLICATION

This application claims priority under 35 U.S.C. §119(e) to U.S. Provisional Patent Application No. 61/449,523 filed on Mar. 4, 2011. The entire disclosure of U.S. Provisional Patent Application No. 61/449,523 is hereby incorporated herein by reference.

FIELD

The present application relates generally to the technical field of automated filling centers. In a specific example, the present application may relate to a high volume pharmacy and to systems and devices used in filling prescriptions and prescription orders at a high volume pharmacy.

BACKGROUND

A high-volume pharmacy, such as a mail order pharmacy, may process and fill a large number of prescriptions and prescription orders. Automated systems may be used by a high volume pharmacy to process and fulfill prescriptions.

Often, more than one prescription drug is required to complete a prescription order. The fulfillment of prescriptions in the prescription order may be fulfilled in different areas of the high-volume pharmacy. After fulfillment, the fulfilled prescriptions are gathered into a complete prescription order for shipping.

DETAILED DESCRIPTION

Example systems and methods for sorting are described. In the following description, for purposes of explanation, numerous specific details are set forth in order to provide a thorough understanding of example embodiments. It will be evident, however, to one of ordinary skill in the art these embodiments may be practiced without these specific details.

Generally, a prescription order is generated for a high volume pharmacy. The prescription order may include more than one prescription drug for fulfillment. The prescription drug for fulfillment in the prescription order constitutes an order component.

The prescriptions may be fulfilled at areas located at various sections of the high volume pharmacy. The sorting, ordering and/or orientating of the order components are provided by the systems and methods herein.

Generally, the order components are containers having a quantity of a prescription drug therein. The containers are selectively allowed to enter into a wheel assembly. The wheel assembly rotates, thereby rotating containers to various points along the wheel assembly's circumference. Attribute sensor units, entry gate, and exit gates may be located at various points along the wheel assembly's rotation. Information about the containers are accessed by the attribute sensor units and used to determine which exit gate should be utilized. Particular order components, constituting a prescription order, are sorted out of a mass of containers (from other prescription orders) to group into the prescription order. Order components or containers belonging to the same prescription order may exit through the same exit gate for grouping the prescription order together.

Figure 1:
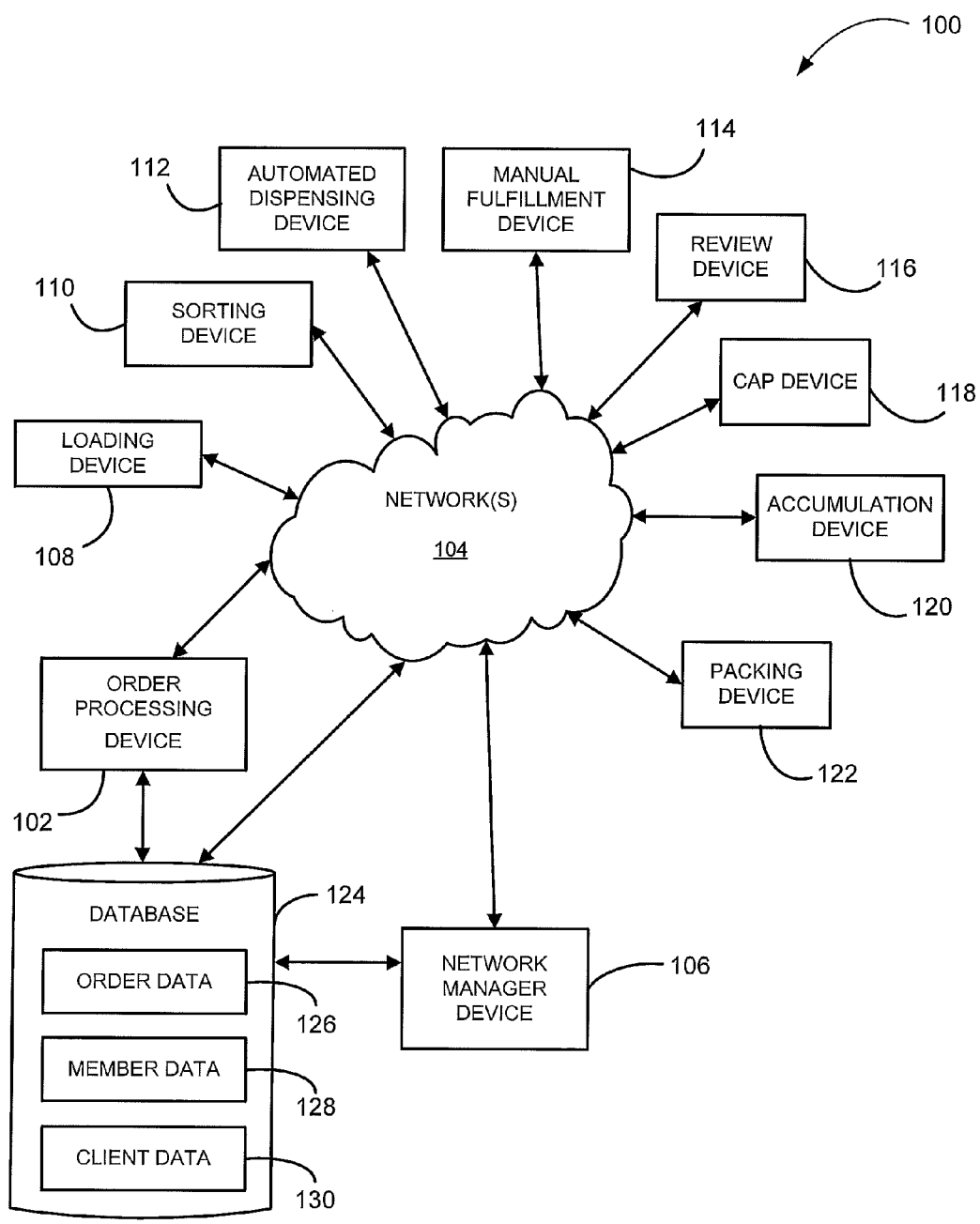
FIG. 1 is a block diagram of an example system according to an example embodiment.

FIG. 1 is a block diagram of an example system 100, according to an example embodiment. While the system 100 is generally described as being deployed in a high volume pharmacy, the automated filling system 100 may otherwise be deployed. The system 100 may include an order processing device 102 in communication with a network manager device 106 over a network 104.

The order processing device 102 may receive information about prescriptions being filled at a pharmacy in which the order processing device 102 is deployed. The order processing device 102 may track a prescription order as it is fulfilled. The order processing device 102 may make routing decisions and/or order consolidation decisions for a prescription order. The order processing device 102 may operate on its own or in combination with the network manager device 106.

Examples of the network 104 include Mobile Communications (GSM) network, a code division multiple access (CDMA) network, 3rd Generation Partnership Project (3GPP), an Internet Protocol (IP) network, a Wireless Application Protocol (WAP) network, a WiFi network, or an IEEE 802.11 standards network, as well as various combinations thereof. Other conventional and/or later developed wired and wireless networks may also be used.

The network manager device 106 is a device operated by an entity at least partially responsible for creation and/or management of the pharmacy benefit. While the network manager operating the network manager device 106 is typically a pharmacy benefit manager, other entities may operate the network manager device 106 either on behalf of themselves, the PBM, or another entity. The network manager device 106 may include a processor, memory to store data and instructions, and a communication device.

Some of the operations of the PBM that operates the network manager device 106 may include the following. A member (or a person on behalf of the member) attempts to obtain a prescription drug at a retail pharmacy location where the member can obtain drugs in a physical store from a pharmacist or pharmacist technician, or in some instances through mail order drug delivery from a mail order pharmacy location. The member may also obtain a prescription drug directly or indirectly through the use of a machine, such as a kiosk, vending unit, mobile electronic device, or a different type of computing device.

The member may have a co-pay for the prescription drug that reflects an amount of money that the member is responsible to pay the pharmacy for the prescription drug. The money paid by the member to the pharmacy may come from the personal funds of the member, a health savings account (HSA) of the member or the member's family, a health reimbursement arrangement (HRA) of the member or the member's family, a flexible spending accounts (FSA) of the member or the member's family, or the like. An employer of the member may directly or indirectly fund or reimburse the member or an account of the member for the co-pay.

The amount of the co-pay paid by the member may vary by the benefit plan of the client with the PBM. The member's co-pay may be based on a flat co-pay (e.g., $10), co-insurance (e.g., 10%), and/or a deductible (e.g., for first $500 of annual prescription drug spend) for certain prescription drugs, certain types of prescription drugs, and/or all prescription drugs.

In certain instances, the member may not pay the co-pay or may only pay for a portion of a co-pay for a prescription drug. For example, if the usual and customary cost for a generic version of a prescription drug is $4, and the member's flat co-pay is $20 for the prescription drug, the member may only pay $4 to receive the prescription drug. In another example involving a worker's compensation claim, no co-pay may be due by the member for the prescription drug.

In conjunction with receiving the co-pay (if any) from the member and dispensing the prescription drug to the member, the pharmacy submits a claim to the PBM for the prescription drug. The PBM may perform certain adjudication functions including verifying the eligibility of the member, reviewing the formulary to determine appropriate co-pay, coinsurance, and deductible for the prescription drug, and performing a drug utilization review (DUR) on the member. The PBM then adjudicates the claim associated with the prescription drug and provides a response to the pharmacy following performance of the aforementioned functions. As part of the adjudication, the client (or the PBM on behalf of the client) ultimately reimburses the pharmacy for filling the prescription drug when the prescription drug was successfully adjudicated. The aforementioned adjudication functions generally occur before the co-pay is received and the prescription drug dispensed. However, the operations may occur simultaneously, substantially simultaneously, or in a different order.

In addition, more or less adjudication functions may be performed as part of the adjudication process. Adjudication may be performed through the use of a machine, such as a computer system.

The amount of reimbursement paid to the pharmacy by the client and/or member may be based at least in part on the type of pharmacy network in which the pharmacy is included. Other factors may be used to determine the reimbursement amount in addition to the type of pharmacy network. The above methodologies may be implemented by executing instructions in the network manager device 106.

The system 100 may include a loading device 108, a sorting device 110, an automated dispensing device 112, a manual fulfillment device 114, a review device 116, a cap device 118, an accumulation device 120 and/or a packing device 122.

The loading device 108 may load prescription containers by a robotic arm, pick and place mechanism, or the like. In one embodiment, the loading device 108 has robotic arms or pickers to grasp a container and move it to and from a pallet. The pallet may be located on a conveyor assembly.

The sorting device 110 may receive containers and may identify the containers that belong to a particular prescription drug order. The sorting device 110 may group the containers according to the prescription drug order in which they belong.

The automated dispensing device 112 includes one or more devices that dispense prescription drugs or pharmaceuticals into containers in accordance with one or more prescription orders. Various automated dispensing systems are available commercially such as e.g., the system sold under the trademark OPTIFILL by AmerisourceBergen Corporation.

The manual fulfillment device 114 assists with manually fulfilling prescriptions. In general, a manual fulfillment may include operations at least partially performed by a pharmacist or pharmacy technician. For example, a person may retrieve a supply of the prescribed drug, may make an observation, may count out a prescribed quantity of drugs and place them into the container, or the like. Some portions of the manual fulfillment process may be automated by use of a machine. For example, counting of capsules, tablets or pills may be at least partially automated (e.g., through use of a pill counter). In some embodiments, the automated fulfillment is integrated with the manual fulfillment operations. Certain automated fulfillment may be performed before manual fulfillment and vice versa. The automated fulfillment for a prescription may be paused to allow for the manual fulfillment to be completed. Once the devices receive an input that manual fulfillment is complete, then the automated fulfillment is released and fulfillment proceeds automatically.

The review device 116 may process containers to be reviewed by a pharmacist. Fulfilled prescriptions may be reviewed and/or verified by a pharmacist, as may be required by state or local law. In other embodiments, prescriptions are reviewed and/or verified for quality assurance. A pharmacist or other licensed person who may dispense certain drugs in compliance with local and/or other laws may operate the review device 116 and visually inspect the container that has been filled with a prescription drug. The pharmacist may review, verify, and/or evaluate drug quantity, drug strength, and/or drug interaction concerns, or otherwise perform pharmacist services.

The cap device 118 may be used to cap the container. In some embodiments, the cap device 118 may provide a type of cap in accordance with a patient preference (e.g., a preference regarding child resistance). The cap device 118 may provide a crown portion, such as a ring or solid top, to cap the container. The ring or solid top operates cooperatively to provide child resistance. In other embodiments, no ring or top over the container and a stand alone base cap may provide an easily-opened cap (e.g., for patients with fine motor disabilities).

The accumulation device 120 accumulates various prescription drugs in a prescription order. The accumulation device 120 may accumulate prescription containers from various area of the high volume fulfillment center. For example, the accumulation device 120 may accumulate prescription containers from the automated dispensing device 112, the manual fulfillment device 114 and the review device 116.

The packing device 122 packages a prescription order in preparation for shipping the order. The packaging device 122 may box or bag the fulfilled prescription order for delivery. The packaging device 122 may further place inserts into the box or bag. The packaging device 122 may label the box or bag with the address. The packaging device 122 may sort the box or bag for mailing in an efficient manner (e.g., sort by delivery address).

While the system 100 in FIG. 1 is shown to include single devices 102, 106-122 multiple devices may be used. The devices 102, 106-122 may be the same type of device or may be different device types. When multiple devices are present, the multiple devices may be of the same device type or may be a different device type. Moreover, system 100 shows a single network 104; however, multiple networks can be used. The multiple networks may communicate in series with each other to link the devices 102, 106-122 or in parallel to link the devices 102, 106-122. Multiple devices may share processing and/or memory resources. The devices 102, 106-122 may be located in the same area or in different locations. For example, the devices 102, 106-122 may be located in a building or set of adjoining buildings. The devices 102, 106-122 may be interconnected (e.g. by conveyors), networked or otherwise in contact with one another.

In some embodiments, at least some of the functionality of the order processing device 102 may be included in the network manager device 106. In other embodiments, at least some of the functionality of the order processing device 102 may be included in the manual fulfillment device 114 and/or the review device 116 and vice versa.

The order processing device 102 may be in a client-server relationship with the network manager device 106, a peer-to-peer relationship with the network manager device 106, or in a different type of relationship with the network manager device 106.

The order processing device 102 and/or the network manager device 106 may be in communication directly (e.g., through local storage) and/or through the network 104 (e.g., in a cloud configuration or software as a service) with a database 124 (e.g., as may be retained in memory or otherwise). The database 124 may store order data 126, member data 128 and/or client data 130.

The order data 126 may include data used for completion of the prescription, such as prescription materials. Prescription materials are a type of order materials that include an electronic copy of information regarding the prescription drug for inclusion with the fulfilled prescription. The prescription materials may include electronic information regarding drug interaction warnings, recommended usage, possible side effects, expiration date, number of refills date of prescribing, etc.

The member data 128 includes information regarding the members associated with the benefit manager. Examples of the member data 128 include name, address, telephone number, e-mail address, prescription drug history, and the like. The member data 128 may include a client identifier that identifies the client associated with the member and/or a member identifier that identifies the member to the client. The member data 128 may include a member identifier that identifies the client associated with the patient and/or a patient identifier that identifies the patient to the client. The member data 128 may also include, by way of example, dispensation preferences such as type of label, type of cap, message preferences, language preferences, or the like. The member data 128 may be accessed by the devices 102, 106-122 to obtain the necessary information for fulfilling the prescription and shipping the prescription drugs.

The client data 130 includes information regarding the clients of the benefit manager. Examples of the client data 130 include company name, company address, contact name, contact telephone number, contact e-mail address, and the like.

Figure 2:
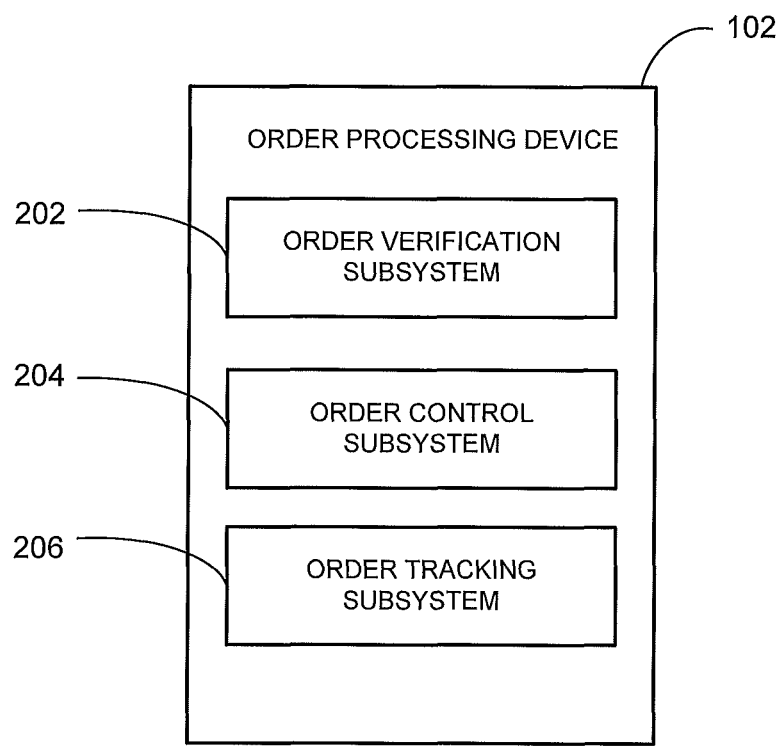
FIG. 2 is a block diagram of an example order processing device that may be deployed within the system of FIG. 1, according to an example embodiment.

FIG. 2 illustrates the order processing device 102, according to an example embodiment. The order processing device 102 may be used by one or more operators to generate prescription orders, make routing decisions, and/or make prescription order consolidation decisions. For example, the prescription order may be comprised of order components. The order processing device 102 may receive instructions to fulfill an order without operator intervention. An order component may include a prescription drug fulfilled in the container by the system 100. The order processing device 102 may direct an order component to the manual fulfillment device 114 or the review device 116 and direct other components to the automated dispensing device 112. The order processing device 102 may direct all order components to the accumulation device 120 for aggregation before shipping. The order processing device 102 may direct order components to the sorting device 110 for sorting. The order processing device 102 may direct the order components directly to the packing device 122 if the prescription order does not require sorting or accumulation from various areas of the pharmacy for completion. The order processing device 102 may be deployed in the system 100, or may otherwise be used.

The order processing device 102 may include an order verification subsystem 202, an order control subsystem 204 and/or an order tracking subsystem 206.

The order verification subsystem 202 may communicate with the network manager device 106 to verify the eligibility of the member, review the formulary to determine appropriate co-pay, coinsurance, and deductible for the prescription drug, and/or perform a drug utilization review (DUR).

The order control subsystem 204 controls various movements of the containers and/or pallets along with various filling functions during progression through the system 100. For example, the order control subsystem 204 may identify the prescribed drug as needing to be fulfilled manually and may direct the container or order component to the manual fulfillment device 114 to achieve the manual fulfillment. The devices 108-122 may be interconnected by a system of conveyors or other container movement systems. Thus, the order control subsystem 204 may control various conveyors to deliver the pallet from the loading device 108 to the manual fulfillment device 114, for example.

The order tracking subsystem 206 tracks a prescription order as it progresses (or stops) toward fulfillment. The order tracking subsystem 206 may track, record and/or update order history, order status or the like. The order tracking subsystem 206 may store data locally (e.g., in a memory) or at the order data 124.

Figure 3A:
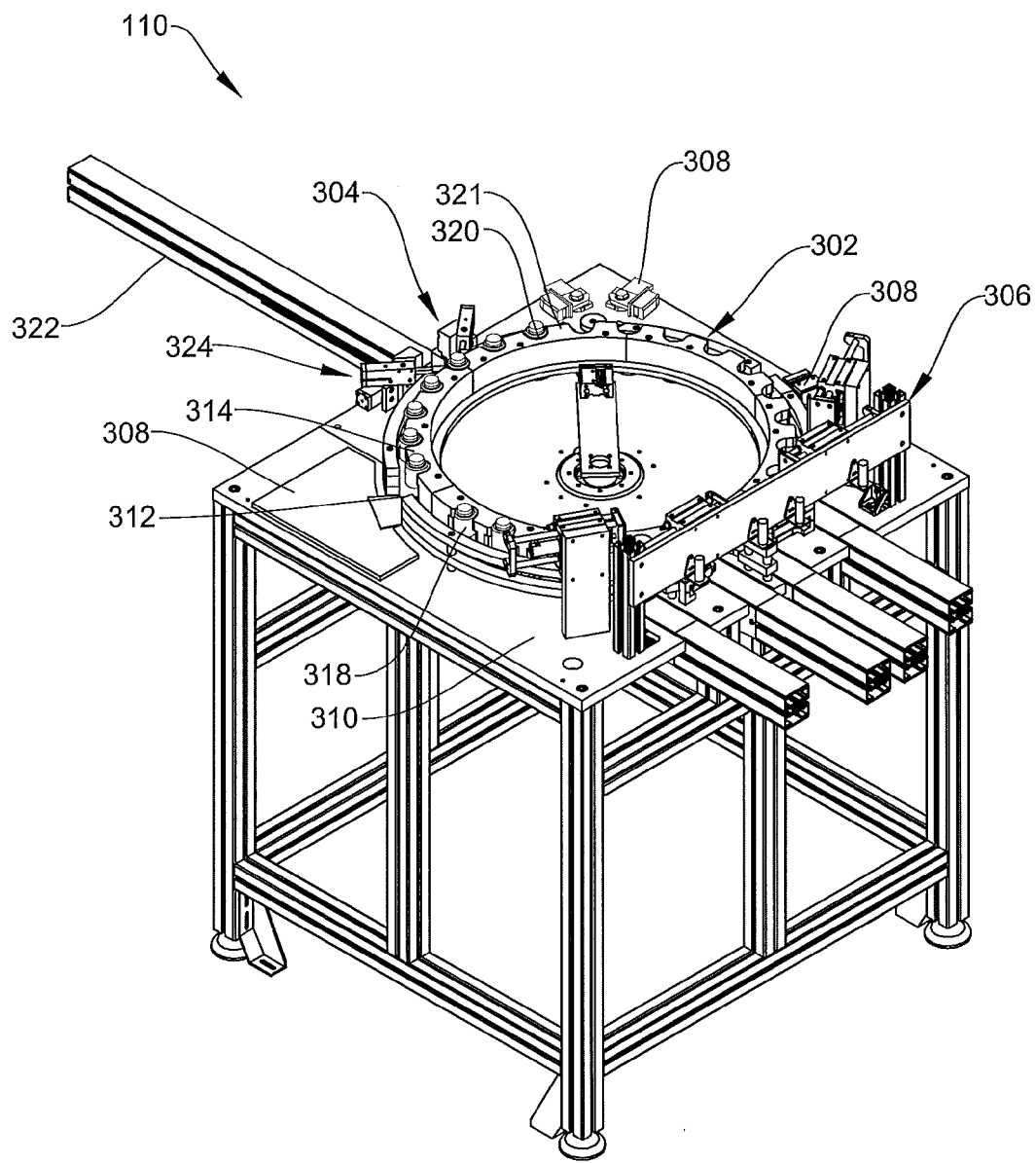
FIG. 3A is a schematic representation of the sorting device that may be deployed within the system of FIG. 1, according to an example embodiment.
Figure 3B:
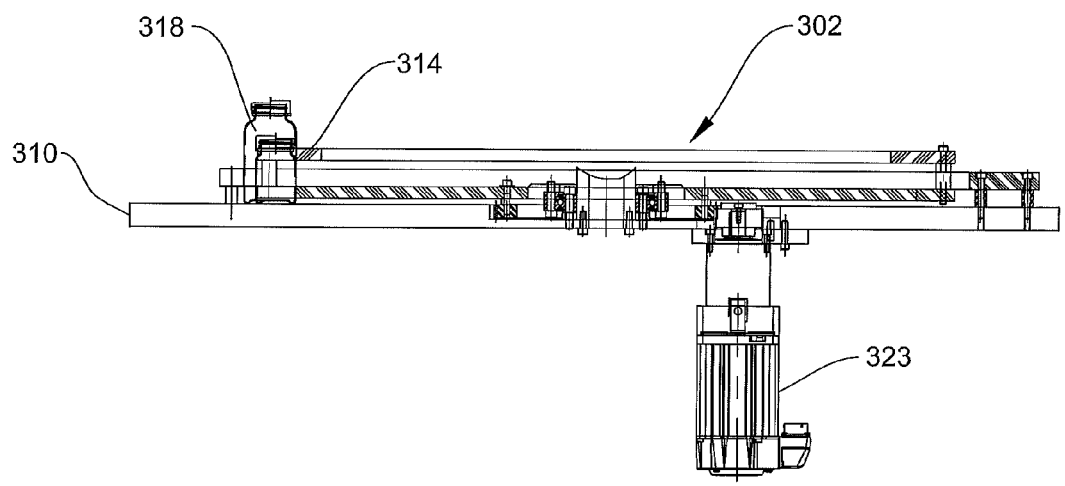
FIG. 3B is a partial cross sectional view of a wheel assembly that may be deployed in the sorting device, according to an example embodiment.
Figure 3C:
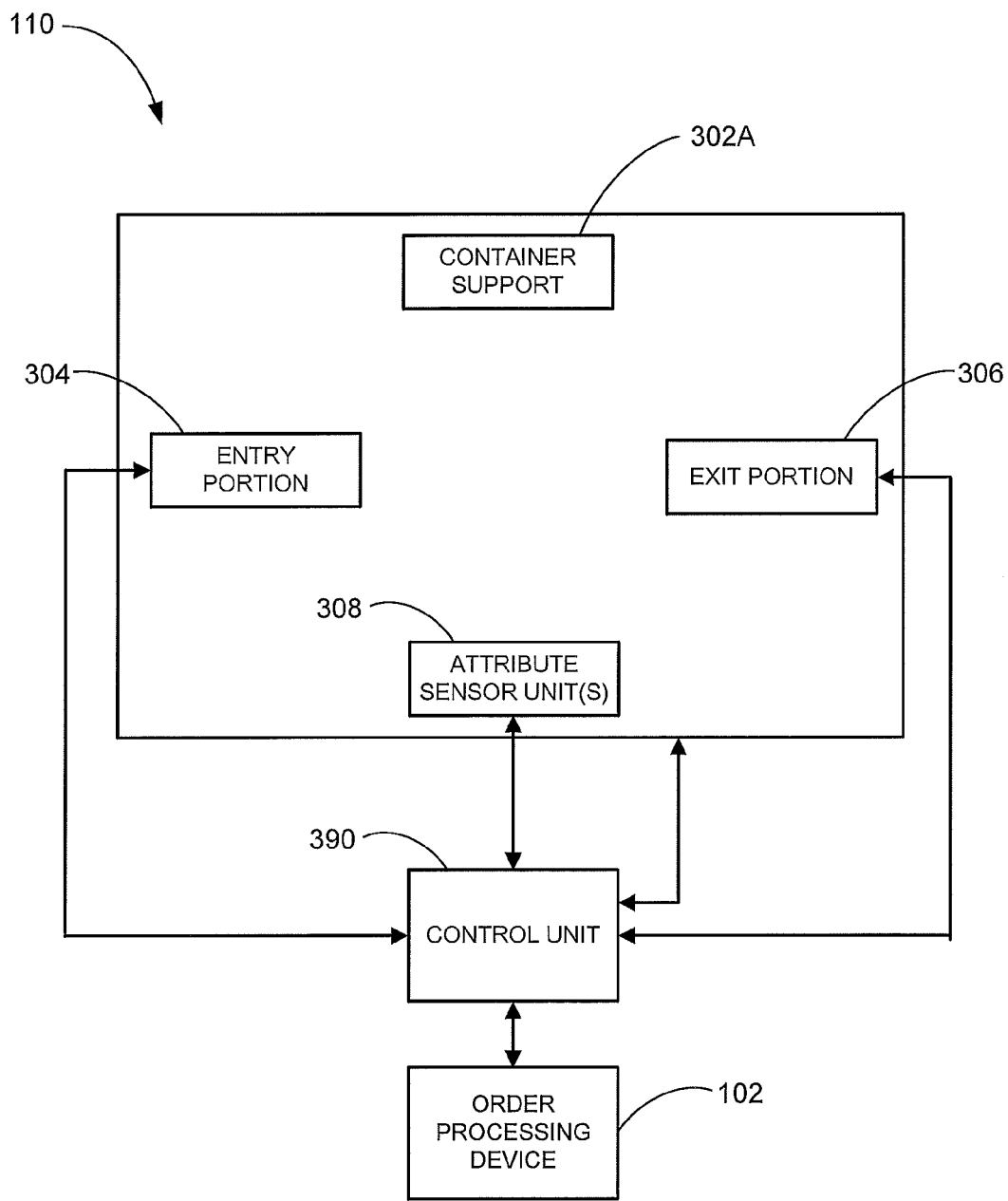
FIG. 3C is a block diagram of an example sorting device that may be deployed within the system of FIG. 1, according to an example embodiment.

Referring now to FIGS. 3A-3C, a sorting device 110 is illustrated according to an example embodiment. The sorting device 110 sorts, orders and/or compiles containers into a single area.

The sorting device 110 may comprise a wheel assembly 302, an entry portion 304, an exit portion 306 and multiple attribute sensor units 308. The wheel assembly 302 moves containers to desired locations and holds containers until a desired release time. The wheel assembly 302 includes a wheel support member 310, an outer guide member 312 and an inner guide member 314. The outer guide member 312 is an annular member disposed at a circumference around the inner guide member 314 and supported by the wheel support member 310. The outer guide member 312 may be stationary relative the wheel support member 310. The inner guide member 314 is an annular member (e.g. a notched disc) disposed at the wheel support member 310 within the outer guide member 312. The inner guide member 314 may be rotatable about a center axis relative the outer guide member 312. The outer guide member 312 is raised a distance above the wheel support member 310 so as to contact a container 318 between bottom and top portions of the container 318. The inner guide member 314 includes multiple pocket sections 320 about its circumference. The pocket sections 320 may be a series of arc-shaped notches adapted to receive containers 318. The pocket sections 320 are separated by radially extending spokes 321. Containers 318 may rest within, but are not firmly held by, the pocket sections 320. The pocket sections 320 are sized and configured to accommodate a range of container sizes. Other suitable shapes of the pocket section 320 that retain the container 318 may be used. The container 318 and/or the pocket sections 320 may be electronically identifiable. For example, the container 318 and/or the pocket section 320 may have a tag, bar code, RFID transponder, or the like for allowing electronic identification of the pocket section 320. The attribute sensor unit 308 may identify the container 318 and/or the pocket section 320 by scanning a tag, for example. The identified container 318 may be assigned to the identified pocket section 320, in which the container 318 lies, in memory, for example.

The inner guide member 314 is attached to an actuator 323. The actuator 323 may be a servo motor, such as that from Rockwell Automation of Milwaukee, Wis., to rotate the inner guide member 314 in increments with pauses between the rotations. Additional, containers 318 may be loaded into the pocket sections 320 during the pause between incremental movements. The inner guide member 314 may rotate a number of degrees (e.g. in between pauses) based on the number of pocket sections 320. The inner guide member 314 may include approximately 25 pocket sections 320, for example. In one example embodiment, the inner guide member 314 may rotate at about 14.4° intervals (360°/25). The intervals may accommodate time for entry of containers 318, label reading (scanning), exiting of containers 318, weight checking of containers 318, or other functions. The pocket sections 320 may be spaced about the circumference of the inner guide member 314 with substantial uniformity, or spacing may vary. A quantity of pocket sections 320 may be equal to or approximately equal to the capacity of a pallet used to carry multiple containers 318 together.

Points about the outer guide member 312 may be numbered and identified by the number of pocket sections 320. By way of example, if the inner guide member 314 has 25 pocket sections 320 408, the entry portion 304 may be at station 1, an attribute sensor unit 308 may be at station 4, a different attribute sensor unit 308 may be at station 7 and the exit portion 306 may be at stations 9, 11, 12 and 14.

The entry portion 304 may include a conveyor mechanism 322, such as that from Bosch Rexroth, Inc. of Hoffman Estates, Ill., and an entry gate mechanism 324 proximal the conveyor mechanism 322. The wheel support member 310 may support at least a portion of the conveyor mechanism 322 and the entry gate mechanism 324. The entry gate mechanism 324 is arranged proximal the wheel assembly 302 and adapted to selectively prevent or allow the container 318 from entering into a pocket section 320.

Referring now to FIG. 3C, a sorting device 110 is illustrated according to an example embodiment. The sorting device 110 sorts, orders and/or compiles containers into a single area. The sorting device 110 may comprise a container support 302A, an entry portion 304, an exit portion 306, attribute sensor unit(s) 308, and a control unit 390. The container support 302A moves containers to desired locations and holds containers, (e.g., on its support surface) until a desired release time. An example to the container support 302A can be a rotating device, (e.g., the wheel assembly 302 described herein) that holds the container(s) at the container support while allowing selection of a unique container. The container support 302A includes locations at which individual containers may be held. Each of these locations may include an identifier unique to the location. The container support 302A may include a guide to selectively hold container at the location. The entry portion 304 includes structure to move the container 318 from a location remote the container support 302A to the container support 302A. The exit portion 308 includes structure to move the container 318 from the container support 302A to a location remote from the container support 302A. The attribute sensor unit 308 is to help identify the container at the container support 302A (e.g., identify the container directly or identify the location at which the container is located). Further electronics can associate a unique container, and hence its drug contents, to an identified location. The control unit 390, according to an example embodiment, may be communicatively connected to the order processing device 102, the container support 302A, the entry device 304, the exit device 306 and the sensor units 308. The control unit 390 may include a processor to execute instructions and issue further control instructions over its communication connections. The control unit 390 may include a memory to store instructions and data received from any one of the order processing device 102, the container support 302A, the entry device 304, the exit device 306 and the sensor units 308.

Figure 4A:
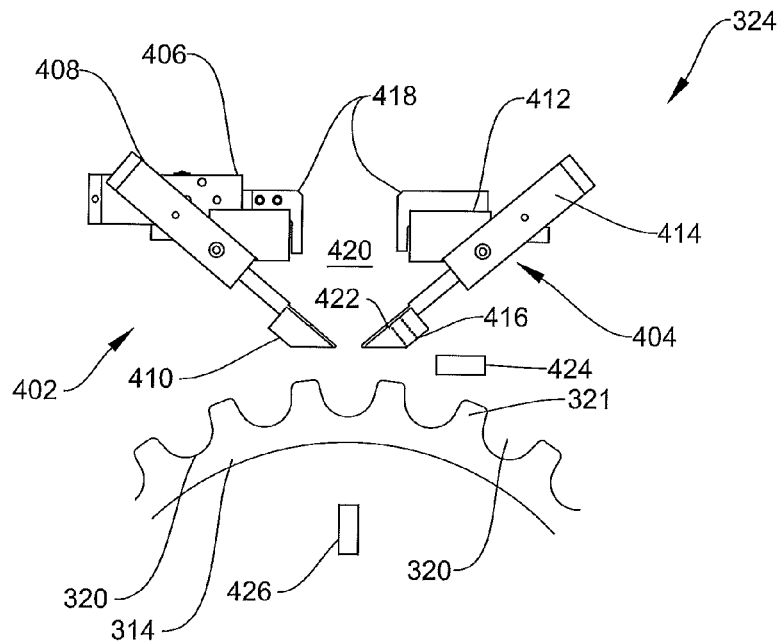
FIG. 4A is a top view of an entry mechanism that may be deployed in the sorting device, according to an example embodiment.
Figure 4B:
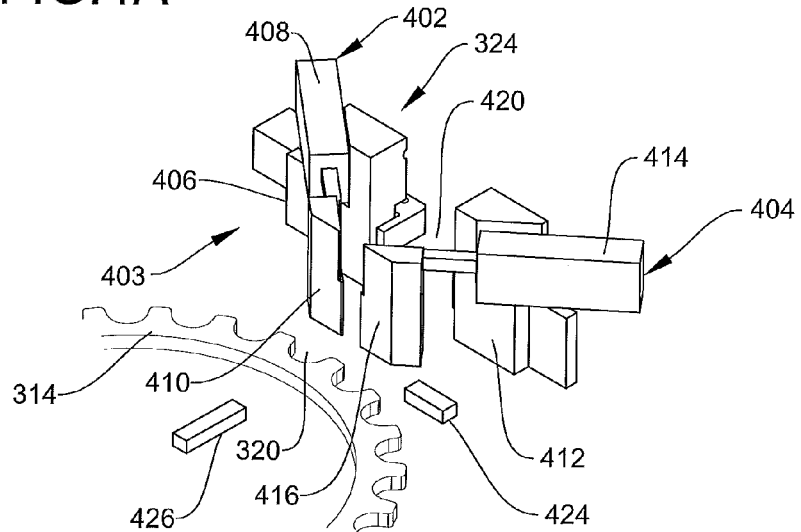
FIG. 4B is a perspective view of the entry mechanism of FIG. 4A, according to an example embodiment.

An example of an entry gate mechanism 324 is illustrated in FIGS. 4A and 4B. In this embodiment, the container 318 approaches an entry gate mechanism 324 via the conveyor mechanism 322. The container 318 may continue through the gate mechanism 324 and into the pocket section 320 via the conveyor mechanism 322 if unrestricted by the gate mechanism 324. That is, the gate mechanism 324 selectively prevents and allows the container 318 to proceed to the pocket section 320 via the conveyor mechanism 322.

The gate mechanism 324 may comprise a first stop gate 402 and a second stop gate 404. In some embodiments, the may be a single stop gate. The first stop gate 402 is disposed on an opposite side of the conveyor mechanism 322 from the second stop gate 404. The first stop gate 402 may cooperate with the second stop gate 404 to selectively pass the container 318 through the gate mechanism 324. The first stop gate 402 may include a first base member 406, a first actuator 408 and a first stop member 410. The first base member 406 supports the first stop gate 402 and is immovably secured to a table, support structure, or the like. The first actuator 408 is positioned on the first base member 406 at an acute angle with reference to the conveyor mechanism 322. The first stop member 410 is attached to the first actuator 408 for linear movement towards and away from the conveyor mechanism 322 or the second stop gate 404.

The second stop gate 404 may include a second base member 412, a second actuator 414 and a second stop member 416. The second base member 412 supports the second stop gate 404 and is immovably secured to a table or the like. The second actuator 414 is positioned on the second base member 412 at an acute angle with reference to the conveyor mechanism 322. The second stop member 416 is attached to the second actuator 414 for linear movement towards and away from the conveyor mechanism 322 or the first stop gate 402. The actuators 408, 414 may be pneumatic or hydraulic cylinders, for example.

The first and second base members 406, 412 may have a bumper 418 to guide the container 318 toward the first and second stop members 410, 416. In the embodiment of FIGS. 4A and 4B, the first and second stop members 410, 416 are wedged members at an extended position. At the extended position, the first and second stop members 410, 416 are spaced apart at a distance smaller than a width of the container 318, thereby stopping movement of the container 318. The first and second stop members 410, 416 may have a retracted position in which the first and second stop members 410, 416 are spaced apart at a distance larger than a width of the container 318.

The first and second stop gates 402, 404 form an entry pocket 420 where one or more containers 318 may accumulate. The entry pocket 420 may be a space bordered by, for example, the first and second base members 406, 412, and/or the first and second stop members 410, 416.

The entry gate mechanism 324 may further include an entry detection sensor 422 to detect the presence or absence of the container 318 at the entry pocket 420. In this embodiment, the entry detection sensor 422 is integral with the second stop member 416; however, in other embodiments, the first stop member 410 or the first and second stop members 410, 416 may have an entry detection sensor 422. In some embodiments, the entry detection sensor will be disposed separately from the first and second stop members 410, 416 in or near the entry pocket 420.

In an example embodiment of the sorting device 110, a gap detection sensor 424 may be provided at a position between the first or second stop gate 402, 404 and the wheel assembly 302. The gap detection sensor 424 detects the presence or absence of the container 318 in a gap between the entry gate mechanism 324 and the spoke 321 or pocket section 320.

The wheel assembly 302 may further include a pocket detection sensor 426 to detect the presence or absence of the container 318. Whether a pocket section 320 opposite the entry gate mechanism 324 is empty or full may be determined at least in part by the pocket detection sensor 426 adapted to register the presence or absence of the container 318 at the pocket section 320 prior to the release of the container 318 by the entry gate mechanism 324. The entry detection sensor 422, 424, 426 may be an object or proximity detector in the form of a proximity switch, light beam sensing switch, or ultrasonic switch, for example. In other embodiments, the entry detection sensor 422 may be an electrical, optical, and/or mechanical device capable of detecting the presence or absence of an object.

Figure 5A:
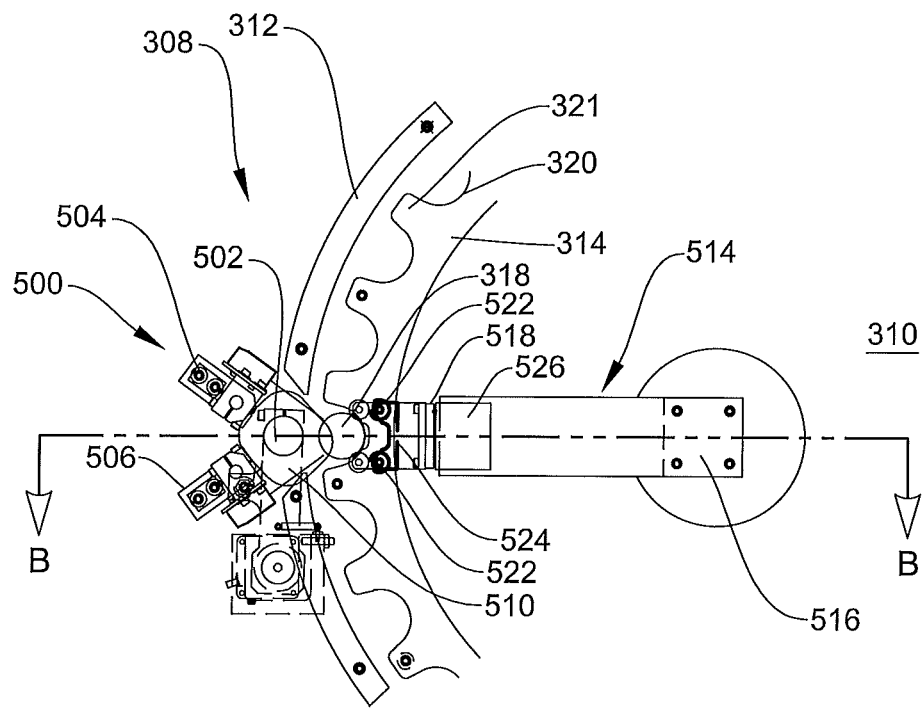
FIG. 5A is a top view of an attribute sensor unit that may be deployed in the sorting device of FIG. 1, according to an example embodiment.
Figure 5B:
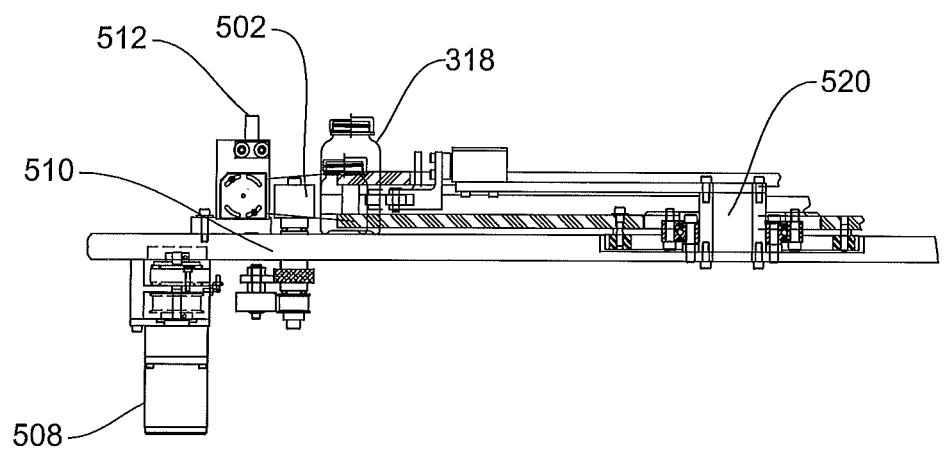
FIG. 5B is a partial cross section view off the attribute sensor unit of FIG. 5A, according to an example embodiment.

Referring to FIGS. 5A and 5B, an example embodiment of the attribute sensor unit 308 is illustrated as a reader assembly 500, according to one embodiment. The reader assembly 500 may be disposed at an outer circumference of the outer guide member 312. The attribute sensor unit 308 may be located at the entrance or at any position or positions before an exit. The reader assembly 500 may obtain information about the container 318 within the sorting device 120. That is, the reader assembly 500 may be adapted to read a label of the container 318. The reader assembly 500 may be adapted to orientate the container 318 so that the label may be read. As used herein, label generally refers to an adhesive substrate with text or graphics, a barcode, an RFID tag or the like.

The reader assembly 500 may include a roller 502, a first scanner 504, a second scanner 506, an actuator 508 and a support member 510. The roller 502 is pivotally disposed on the support member 510 adjacent the inner guide member 314. In the embodiment shown, the reader assembly 500 is disposed at a gap within the outer guide member 312. The first and second scanners 504, 506 may be disposed on the support member 510. Specifically, the support member 510 may have mounting shafts 512 extending upwards therefrom. Each of the scanners 504, 506 are disposed on a respective one of the mounting shafts 512, thereby making the scanners 504, 506 pivotable. The scanners 504, 506 may be manually pivoted and then fixed to the mounting shaft 512 with a tightening bracket or clamp. In some embodiments, the scanners 504, 506 are mechanically rotated via a stepper motor, for example.

The first and second scanners 504, 506 are angled on sides of the roller 502 so that scanning may be performed with minimal interference by the roller 502. In other embodiments, scanning the label may be performed with one scanner 504 or 506. The actuator 508 may be positioned at the support member 510 and may rotate the roller 502 about its vertical axis. The roller 502 is adapted to engage the container 318 located in a pocket section 320 and spin the container 318 about its vertical axis. The roller 502 provides an orientation for the first or second scanner 504, 506 to scan the label regardless of the container's orientation when at rest in the pocket section 320.

Referring to FIG. 5B, an example actuator 508 is shown. The actuator 508 may be a stepper motor from Oriental Motor USA Corp. of Torrance, Calif., for example. Thus, the roller 502 may be rotated with precision to rotate the container 318 to the orientation needed for scanning. In some embodiments, the actuator 508 spins the roller 502 to spin the container 318 without regard to precision.

In other embodiments, the reader assembly 500 may further include an arm stabilizer member 514 that is pivotally attached to the wheel support member 310. The arm stabilizer member 514 may selectively engage the container 318 so as to support the container 318 on a side opposite from the roller 502. Specifically, the arm stabilizer member 514 may extend and retract radially as desired under, over or through the inner guide member 314. Extension of the arm stabilizer member 514 may result in pushing the container 318 against the roller 502 and stabilizing the container 318 as the roller 502 and the container 318 rotate.

The arm stabilizer member 514 may include a pivot end portion 516 and a support end portion 518. The pivot end portion 516 may be pivotally connected to the wheel support member 310. The pivot end portion 516 may be connected to an actuator (not shown), such as a stepper motor, disposed on the opposite side of the wheel support member 310. The end portion 516 and the actuator may be connected by a rotary shaft 520, for example.

The support end portion 518 is disposed at an opposite end of the arm stabilizer member 514 from the pivot end portion 516. The support end portion 518 may include one or more idler rollers 522 and an arcuate section 524 between the idler rollers 522. The idler rollers 522 and the arcuate section 524 may be disposed at an outward face of the support end portion 518. The arcuate section 524 may have a radius smaller than the container 318 to cause the idler rollers 522, disposed at ends of the arcuate section 524, to engage a width of the container 318 smaller than a diameter of the container 318. In other embodiments, the arcuate section 524 has a radius approximately equal to or larger than a diameter of the container 318. The idler rollers 522 may operate in cooperation with the roller 502 with the container 318 engaged therebetween. With the roller 502 and the idler rollers 522 engaging the container 318, the scanners 504, 506 may scan the label on the container 318.

The support end portion 518 may further include an actuator 526 disposed thereon to extend and retract the idler rollers 522 and the arcuate section 524 as desired. The actuator 526 may be a pneumatic or hydraulic cylinder, for example. In other embodiments, the actuator 526 may be a spring actuator that moves the container 318 against the roller 502. For example, the support end portion 518 may extend when the container 318 within the pocket section 320 moves into a position to be read by scanners 504, 506 and may retract to allow the inner guide member 314 to rotate to a next position. The support end portion 518 is disposed at a height above the wheel support member 310 allowing at least a part of the support end portion 518 to extend under, over or through the inner guide member 314. The adjustability of the support end portion 518 may allow the reader assembly 500 to accommodate containers 318 of varying sizes.

Figure 6:
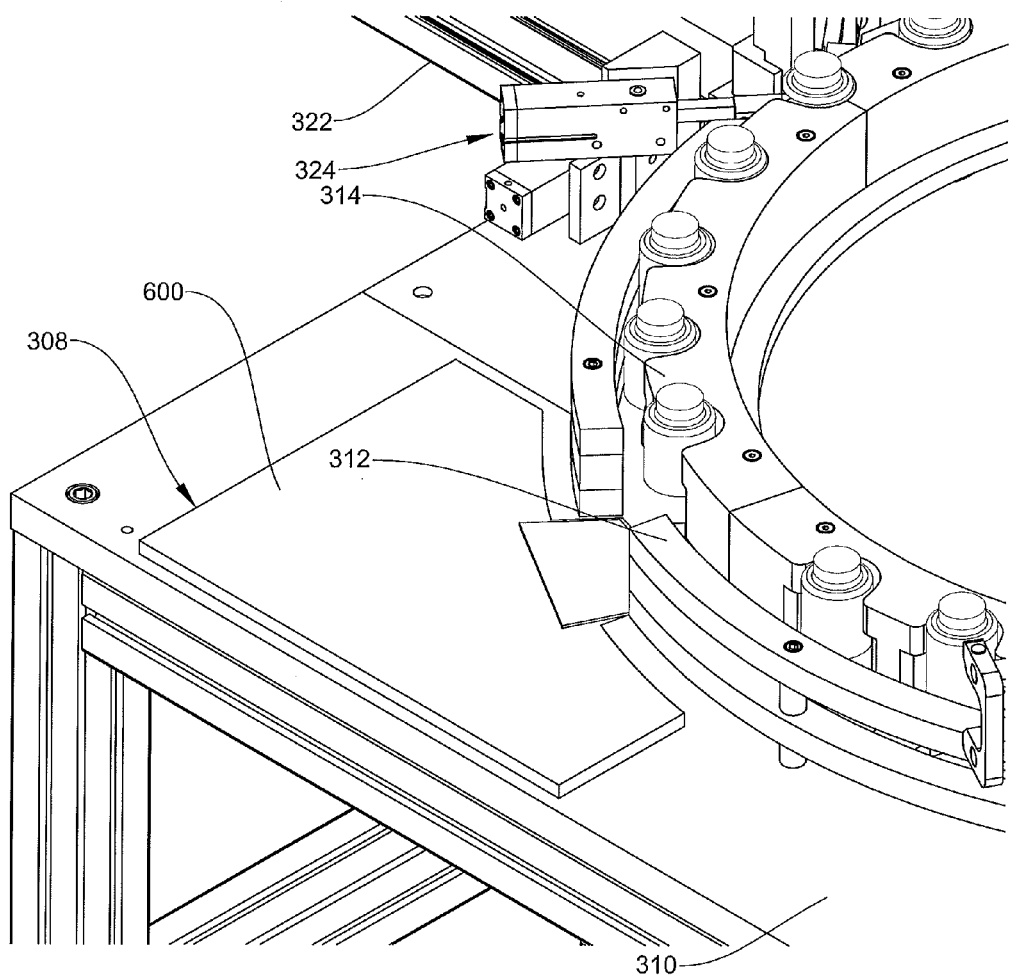
FIG. 6 is a perspective view of an attribute sensor unit that may be deployed in the sorting device, according to an example embodiment.

Referring to FIG. 6, an example attribute sensor unit 308 is illustrated as a scale 600, according to one embodiment. The arm stabilizer member e.g., 514 in FIG. 5 (not shown in FIG. 6 for clarity of illustration) may push the container 318 onto the scale when the container 318 within the pocket section 320 moves into a position adjacent the scale 600. In some embodiments, the spoke 321 may push the container 318 onto the scale as the inner guide member 314 rotates.

Figure 7A:
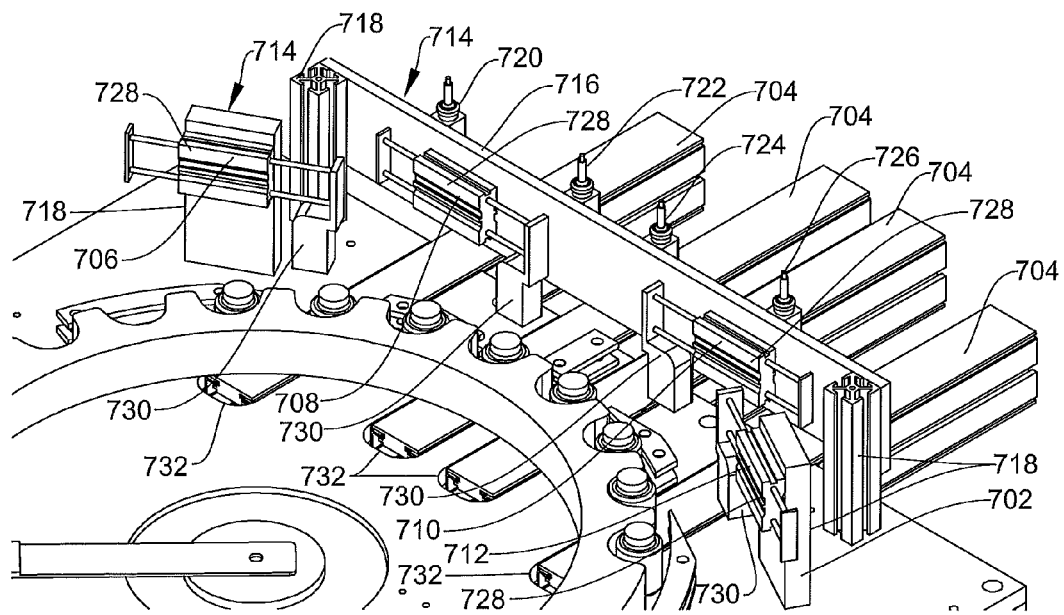
FIG. 7A is a front perspective view of an exit mechanism and wheel assembly that may be deployed in the sorting device of FIG. 1, according to an example embodiment.
Figure 7B:
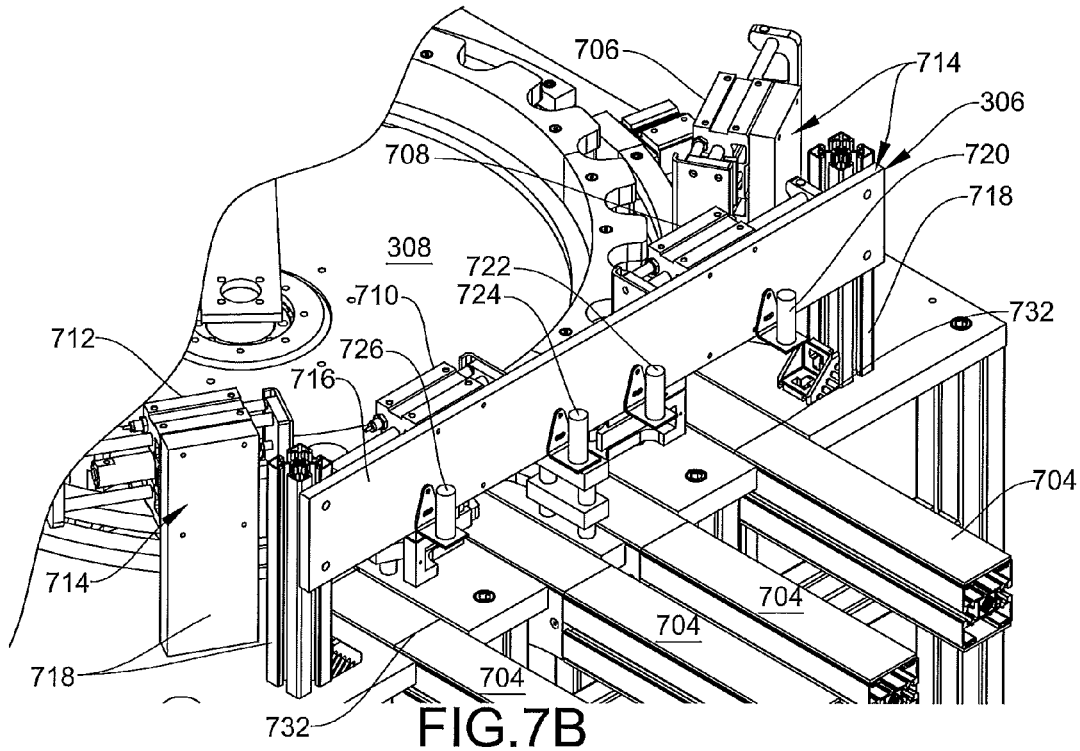
FIG. 7B is a rear perspective view of the exit mechanism and wheel assembly of FIG. 7A, according to an example embodiment.

Referring to FIGS. 7A and 7B, the exit portion 306 is illustrated according to an example embodiment. The exit portion 306 may include an exit gate mechanism 702 and multiple conveyor mechanisms 704 proximal the exit gate mechanism 702. The wheel support member 310 may support at least a portion of the conveyor mechanism 704 and the exit gate mechanism 702. The exit gate mechanism 702 is arranged proximal the wheel assembly 302 and adapted to selectively prevent and allow the container 318 from exiting the pocket section 320.

The exit gate mechanism 702 may include a first exit gate 706, a second exit gate 708, a third exit gate 710 and a fourth exit gate 712. The exit gates 706-712 are aligned with a respective conveyor mechanism 704 to selectively allow access.

The exit gate mechanism 702 may be supported by the wheel support member 310. The exit gate mechanism 702 may include a base member 714 immovably secured to the wheel support member 310. One or more of the exit gates 706-712 may be secured to the base member 714. The base member 714 may include a horizontal section 716 supported by one or more legs 718. The legs 718 may be immovably secured to the wheel support member 310. In the embodiment of FIG. 7, gates 708 and 710 are secured to the horizontal section 716. However, more or fewer exit gates 706-712 may be attached to the horizontal section 716. In the embodiment shown in FIG. 7, the gates 706 and 712 are attached to base members 714 on a leg 718.

The horizontal section 716 may also support multiple exit detection sensors 720, 722, 724, 726. The detection sensors 720-726 may be an object or proximity detector in the form of a proximity switch, light beam sensing switch, or ultrasonic switch, for example. In other embodiments, the exit detection sensors 720-726 may be an electrical, optical, and/or mechanical device capable of detecting the presence or absence of an object. The detection sensors 720-726 may detect whether the container 318 has passed through the exit gate mechanism 702.

The exit gates 706-712 may each comprise an actuator 728 and a stop member 730 positioned on the base member 714. The stop member 730 is attached to the first actuator 728 for linear movement adjacent the conveyor mechanism 704. The actuator 728 may be a pneumatic or hydraulic cylinder, for example, or may be an electro mechanical actuator.

In an example, opened gates 706-712 allow the container 318 in the pocket section 320 opposite an exit gate 706-712 to exit. In one embodiment, a conveyor mechanism 704 has a portion disposed under the inner guide member 314. Furthermore, a void 732 may be formed in the wheel support member 310 to accommodate the conveyor mechanism 704. The conveyor mechanism 704 is adapted to remove the container 318 from the pocket section 320 above it and therefore cause the container 318 to pass through the associated gate 706-712.

When the exit gate 706-712 is closed, it prevents the container 318 from exiting the pocket section 320 and, accordingly, when the inner guide member 314 rotates to the next position, the container 318 remains within the pocket section 320.

In one embodiment, each conveyor mechanism 704 may lead to at least one subsequent destination for containers 318. In some embodiments, subsequent destinations may include one or more of: (a) a pharmacist check center, (b) an order accumulation center, (c) one or more stations for packing and shipping an order, and/or (d) an error station, e.g., a location, such as a holding area, bin, or other receptacle or station, into which containers identified as suspect in some manner, or other containers of an order that include a suspect container, may be placed for further evaluation, such as review by pharmacy personnel.

Figure 8:
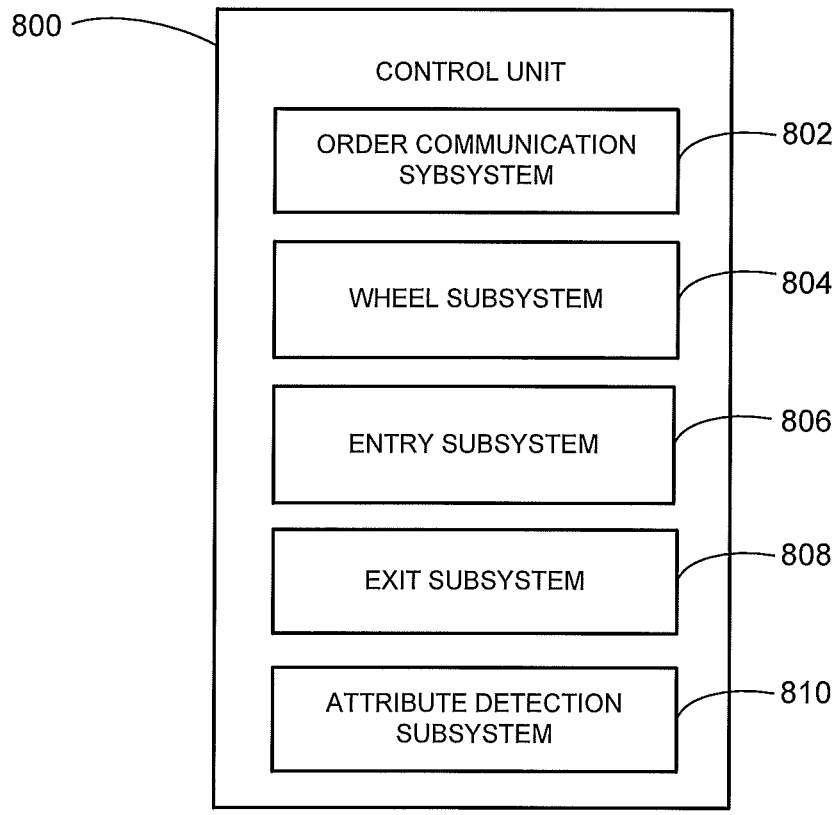
FIG. 8 is a block diagram of a control unit that may be deployed in the sorting device of FIG. 1, according to an example embodiment.

Referring to FIG. 8, the sorting device 110 further comprises a control unit 800 according to an example embodiment. The control unit 800 (e.g. control unit 390) may be communicatively connected to the processing device 102, the wheel assembly 302, an entry portion 304, an exit portion 306 and multiple attribute sensor units 308.

The control unit 800 may include an order communication subsystem 802, a wheel subsystem 804, an entry subsystem 806, an exit subsystem 808 and an attribute detection subsystem 810.

The order communication subsystem 802 is adapted to manage communications between the subsystems 802-810, and between the control unit 800 and the wheel assembly 302, an entry portion 304, an exit portion 306 and multiple attribute sensor units 308.

The wheel subsystem 804 provides commands and instructions to operate the wheel assembly 302.

The entry subsystem 806 operates the entry portion 304 so that containers 318 are selectively allowed to pass through the entry portion 304.

The exit subsystem 808 provides commands and instructions to operate the exit portion 306 so that containers 318 are selectively allowed to pass through the exit portion 306.

The attribute detection subsystem 810 detects attributes of the container 318 for use in identification, error detection, or the like and operates the attribute sensor units 308.

Figure 9:
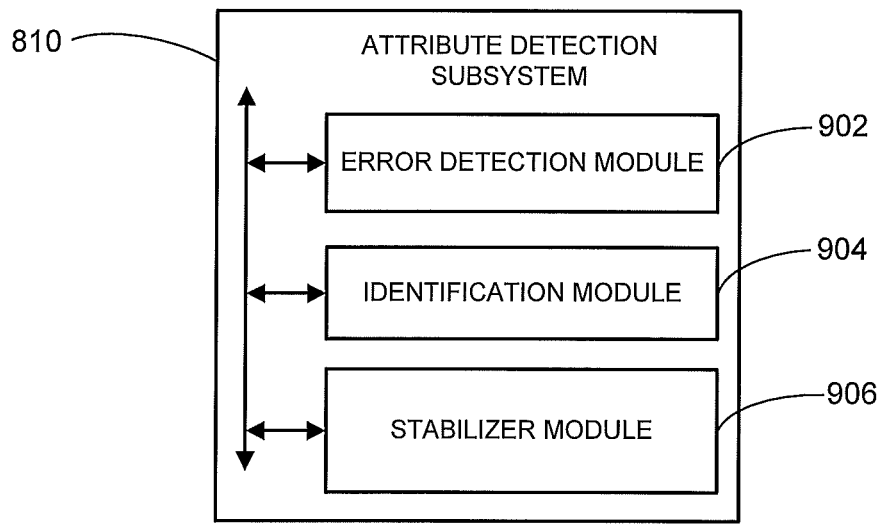
FIG. 9 is a block diagram of an example attribute detection subsystem that may be deployed in the control unit of FIG. 8, according to an example embodiment.

FIG. 9 illustrates an example attribute detection subsystem 810 that may be deployed in the sorter device 110, or otherwise deployed in another system. One or more modules are communicatively coupled and included in the attribute detection subsystem 810 to enable attribute detection. The modules of the attribute detection subsystem 810 that may be included are an error detection module 902, an identification module 904, and/or a stabilizer module 906. Other modules may also be included.

In some embodiments, the modules of the attribute detection subsystem 810 may be distributed so that some of the modules are deployed in the control unit 800 and some modules are deployed in the sorting device 110. In one embodiment, the modules are deployed in memory and executed by a processor coupled to the memory. The functionality contained within the modules 902-906 may be combined into a lesser number of modules, further divided among a greater number of modules, or redistributed among existing modules. Other configurations including the functionality of the modules 902-906 may be used.

The error detection module 902 is adapted to detect errors associated with the container 318. For example, the weight of the container 318 may be compared to a known weight for the particular prescription drug quantity in the container 318. If the container 318 does not weigh substantially the same amount, the error detection module 902 may flag the container 318 as being suspected of having an error.

The error detection module 902 may be communicatively connected to the scanners and/or scales. Information from the scanners 504, 506 or scales 600, as well as information from the identification module 904 may be used to determine likely errors. The error detection module 902 may receive information from the detection sensors 422-426, 720-726 so as to determine whether the container 318 entered or exited as desired. For example, if the pocket section 320 approaching and/or at the first alignment stage is expected to be empty, but a detection device detects the container 318 in the pocket section 320, the container 318 may be flagged as suspect by the error detection module 902 and assigned an exit gate 706-712 that leads to an error station.

The identification module 904 may be communicatively connected to the scanners 504, 506 and/or scale 600. Information from the scanners 504, 506 or scale 600, as well as information from the order processing device 102, may be used by the identification module 904 to identify the containers 318. Identification may be used to register or index the position of the container 318, i.e., in which pocket section 320, in the inner guide member 314. The container 318 may be identified to associate with at least one other container 318 with both forming a prescription order so that the order may be grouped. The identification module 904 may identify or flag the container 318 associated with a pocket section 320 or the pocket section 320 itself as suspect if, for example, the label of the container 318 is unreadable, information obtained from the container label is inconsistent with expected or stored information (e.g., information expected based on prescription information in a prescription database), or the like.

The stabilizer module 906 may control accessing attributes of the container 318 by controlling whether the arm stabilizer member 514 extends so as to push the container 318 toward the attribute sensor unit 308. The stabilizer module 906 may control the return of the container 318 to the pocket section 320 after accessing the attributes by controlling the retraction of the actuator 526. The stabilizer module 906 may control rotation of the arm stabilizer member 514 about its pivoting end 516 and rotation of the roller 502.

Figure 10:
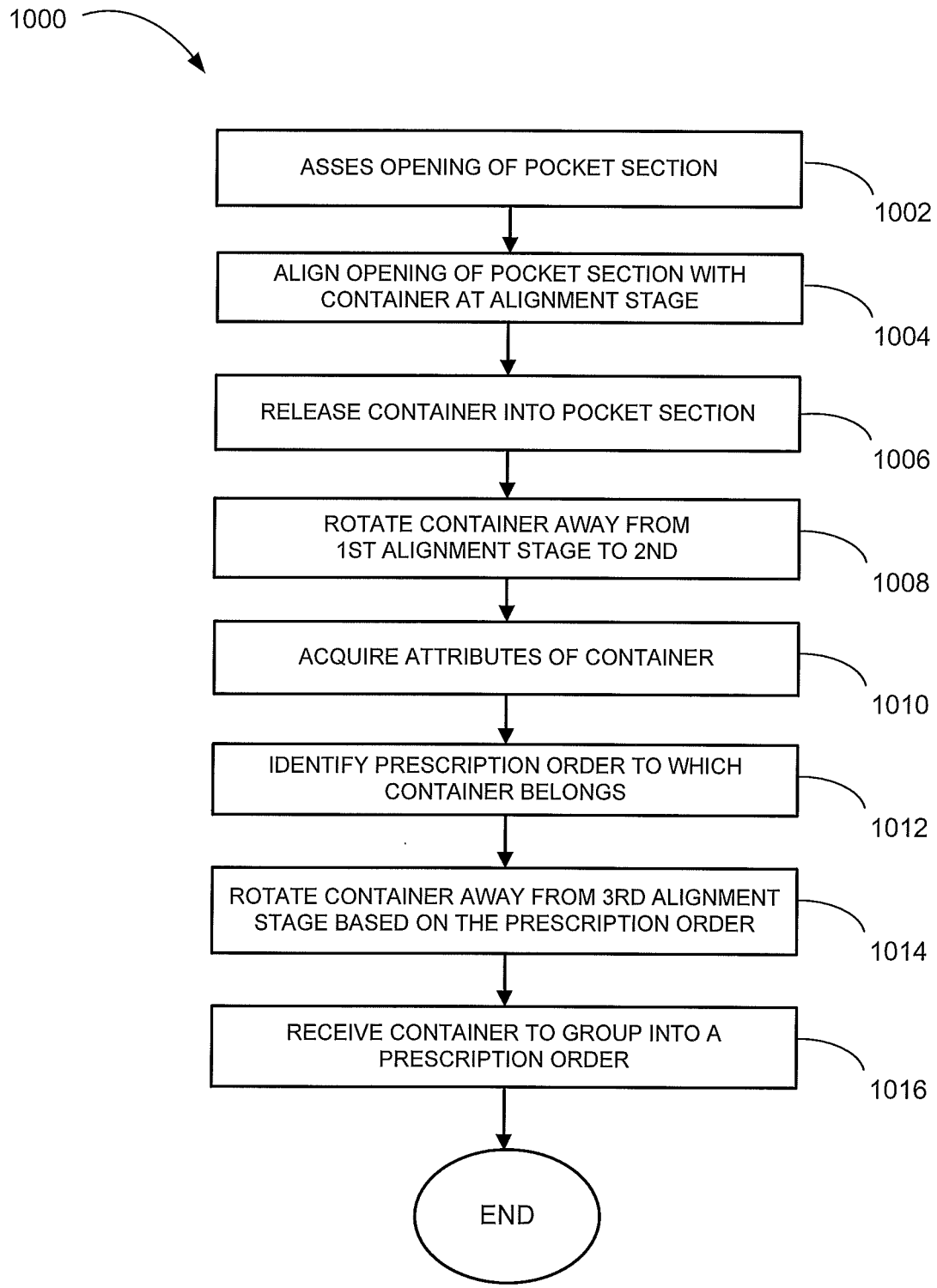
FIG. 10 is an example process flow illustrating a method of sorting, according to an example embodiment.

FIG. 10 illustrates a method 1000 for sorting an entire or partial prescription order, according to an example embodiment. The method 1000 may be performed by the sorting device 110, partially by the order processing device 102 and partially by the network manager device 106, or may be otherwise performed.

At block 1002, an open pocket section 320 is assessed. The order processing device 102 may send a signal to the detection sensors 422-426 requesting status information of the pocket section 320. The detection sensors 422-426 may send data about the presence or lack of the container 318 at the pocket section 320 and/or the entry pocket 420. The entry subsystem 806 may coordinate the opening and closing of the entry portion 304 based on the location of the pocket section 320 with respect to the entry portion 304. At block 1004, an open pocket section 320 is aligned with the entry portion 304 at a first alignment stage (e.g. station 1) of rotation of the wheel assembly 302. The wheel subsystem 804 may rotate the wheel assembly 302 so that the pocket section 320 is aligned with the entry portion 304. If the pocket section 320 that is opposite or aligned with the entry portion 304 is full, the first and second stop gates 402, 404 will remain closed until the inner guide member 314 rotates to position an open pocket section 320 in alignment with the entry portion 304.

At block 1006, the container 318 is released into the pocket section 320. If the presence of the container 318 is detected at the entry pocket 420 and if the pocket section 320 aligned with the entry portion 304 is empty, the first and second stop gates 402, 404 of the gate mechanism 324 may retract respective first and second stop members 410, 416 to open, thereby providing an area for one or more containers 318 to be moved through via the conveyor mechanism 322. In addition, the detection sensor 422, 424, 426 may detect the number of containers 318 passing through the entry gate mechanism 324 and cause the first and second stop gates 402, 404 to close after a desired number of containers 318 have passed.

At block 1008, the container 318 is rotated away from the alignment stage to a second alignment stage. The second alignment stage may be a position of the pocket section 320 aligned with an attribute sensor unit 308, for example.

At block 1010, attributes of the container 318 are acquired. The attributes may be acquired by the attribute sensor unit 308. The attribute sensor unit 308 may include the scanner 504, 506, the scale 600 or the like. For example, if a label of the container 318 cannot be read by the attribute sensor unit 308, other containers 318 of that order, the labels of which may have been read, may be identified as part of an incomplete order. The containers 318 of an apparently incomplete order may be identified as suspect and assigned an exit gate 706-712 that leads to an error station.

At block 1012, the prescription order to which the container belongs is identified. After a label of the container 318 has been scanned by scanner 504, 506 at the attribute sensor unit 308, the container 318 and its prescription order, of which it is associated, may be identified. Attributes obtained from the container 318 by the scanner 504, 506, such as the type and quantity of prescription drug contained therein, may be utilized to compare with attributes obtained from the scale 600. The position of the container 318 in the inner guide member 314 may be registered or indexed, i.e., associate with a particular pocket section 320. The attribute sensor unit 308 or the detection sensors 422-426 may identify the pocket section 320 as being full or empty. The state of full or empty may be compared with an expected state of the pocket section 320. If an inconsistency exists, the inconsistency may trigger an error response, such as flagging the container 318 in the expected-empty pocket section 320 as suspect and assigning an exit gate 706-712 that leads to an error station, or, if no container is detected when one is expected, flagging containers 318 associated with the same prescription order as the missing container 318 (since the prescription order may now be incomplete) and assigning the exit gate 706-712 or third alignment stage that leads to an error station.

At block 1014, the container is rotated away from the second alignment stage to a third alignment stage based on the identified prescription order or flagged inconsistency. The third alignment stage may be aligned with the exit gate 706-712 based on the identified prescription order or the flagged inconsistency. Any additional containers 318 belonging to the identified prescription order may be assigned to the same exit gate 706-712 to group the containers 318 of the same prescription order together.

At block 1016, the container 318 is released to group into a prescription order. The container 318 may be grouped with an additional container 318 in the identified prescription order. In general, additional container 318, as used herein, refers to a single additional container 318 or multiple additional containers 318. The designated exit gate 706-712 may retract the stop member 730 and the conveyor mechanism 704 may move the container 318 through the exit gate mechanism 702. In an example embodiment, if the container 318 has been designated to exit the pocket section 320 at the exit gate 706-712, but the detection sensor 720-726 associated with the exit gate 706-712 fails to detect the container 318, the container 318 associated with that pocket section 320 may be flagged as suspect by the control unit 800. The container 318 may then be assigned to an exit gate 706-712 that leads to an error station along with any other containers 318 associated with the same prescription order. If the label of the container 318 is read at the attribute sensor unit 308 subsequent to being flagged, the container 318 may exit at the exit gate 706-712 that does not lead to an error station upon rotation thereto.

Figure 11:
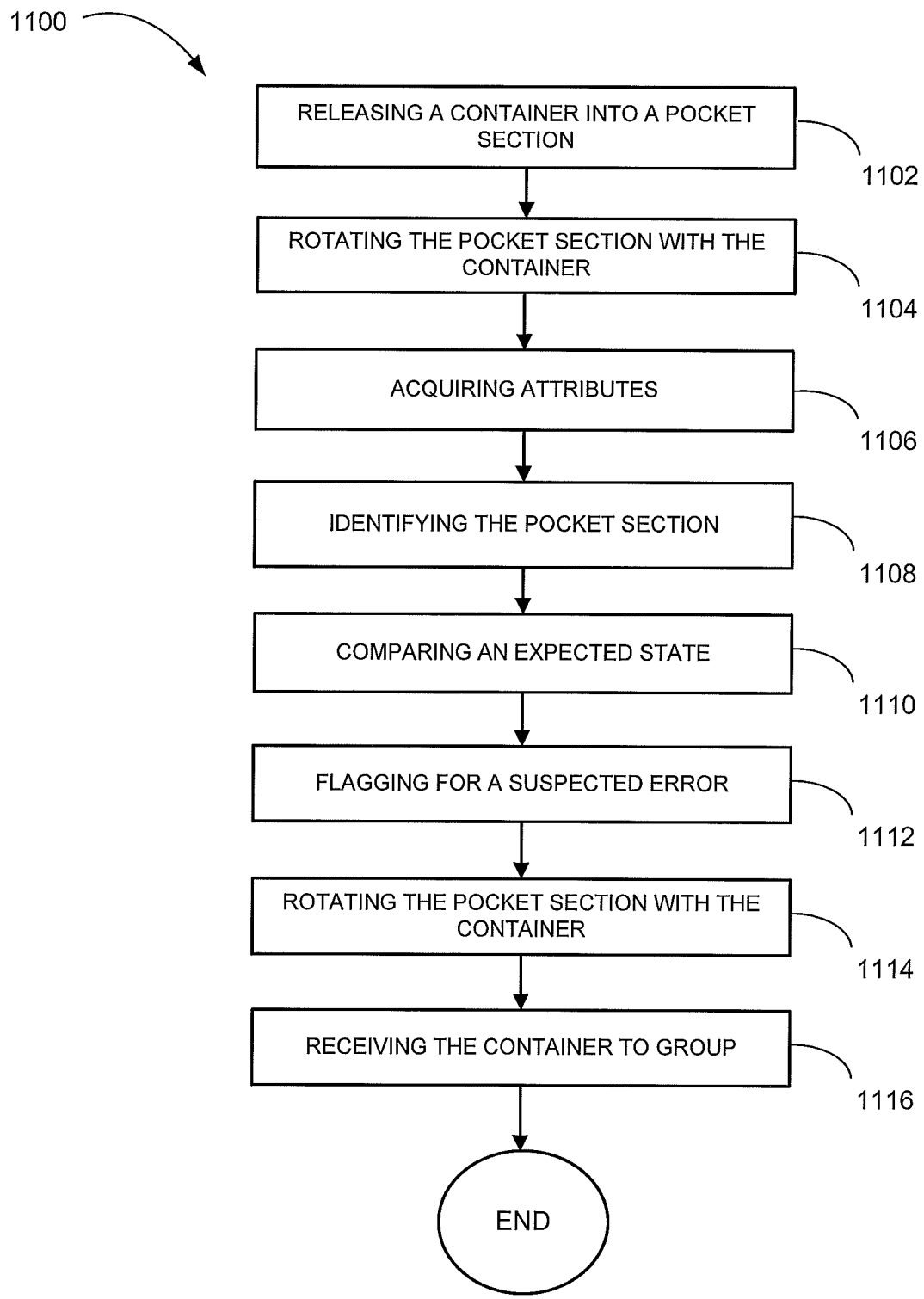
FIG. 11 is an example process flow illustrating a method of sorting and identifying errors, according to an example embodiment.

FIG. 11 illustrates a method 1100 according to an example embodiment. The method 1100 may be performed by the sorting device 110, partially by the order processing device 102 and partially by the network manager device 106 or may otherwise be performed.

At block 1102, the container 314 is released into a pocket section 320. The pocket section 320 is located at a first alignment stage. The detection sensors for 422-426 may send data about the presence or lack of the container 318 at the entry pocket for 20 in or 320.

At block 1104, the pocket section 320 with the container 318 is rotated away from the first alignment stage to a second alignment stage.

At block 1106, attributes of the container 318 are acquired at the second alignment stage. At the second alignment stage, the pocket section 320 may be aligned with the attribute sensor unit 308, for example. The attributes may be acquired by the attribute sensor unit 308. The attribute sensor unit 308 may include the scanner 504, 506, the scale 600 or the like. The stabilizer module 906 may command the roller 502 and/or the stabilizer arm member 514 to engage the container 318 while acquiring the attributes.

At block 1108, after the attributes are acquired, the container 318 and its prescription order, of which it is associated may be identified. The position of the container 318 in the inner guide member 314 is registered or index, i.e., associate with a particular pocket section 320. The attribute sensor unit 308 or the detection sensors 422-426 may identify and the identification module 904 may recognize the pocket section 320 as being full with the container 318 or empty without the container 318.

At block 1110, the state of full or empty may be compared with an expected state of the pocket section 320. An expected state may be stored or obtained from the processing device 102, for example. The error detection module 902 may access the current state from the identification module 904 and compare with the expected state.

At block 1112, if an inconsistency exists, the inconsistency may trigger an error response, such as flagging the pocket section 320 and/or the container 318 in the expected-empty pocket section 320 as suspect. The container 318 may be flagged and the wheel subsystem 804 and the exit subsystem 808 may coordinate for the container 318 to exit.

At block 1114, the pocket section 320 with the flagged container 318 is rotated to a third alignment stage. The third alignment stage may be aligned with the exit gate 706-712. The exit gate 706-712 may be selected based on the inconsistency.

At block 1116, the container 318 is received at the exit gate 706-712 to be grouped with one or more containers 318 in the prescription order. The exit gate 706-712 may lead to an error station or the like. Or, if no container 318 is detected when one is expected, containers 318 associated with the same prescription order as the missing container 318 are flagged (since the prescription order may now be incomplete) and assigned to the exit gate 706-712 or third alignment stage that leads to an error station or the like. In some embodiments, a single exit gate 706-712 may lead to more than one subsequent destination by utilizing diverters and branching conveyors.

Figure 12:
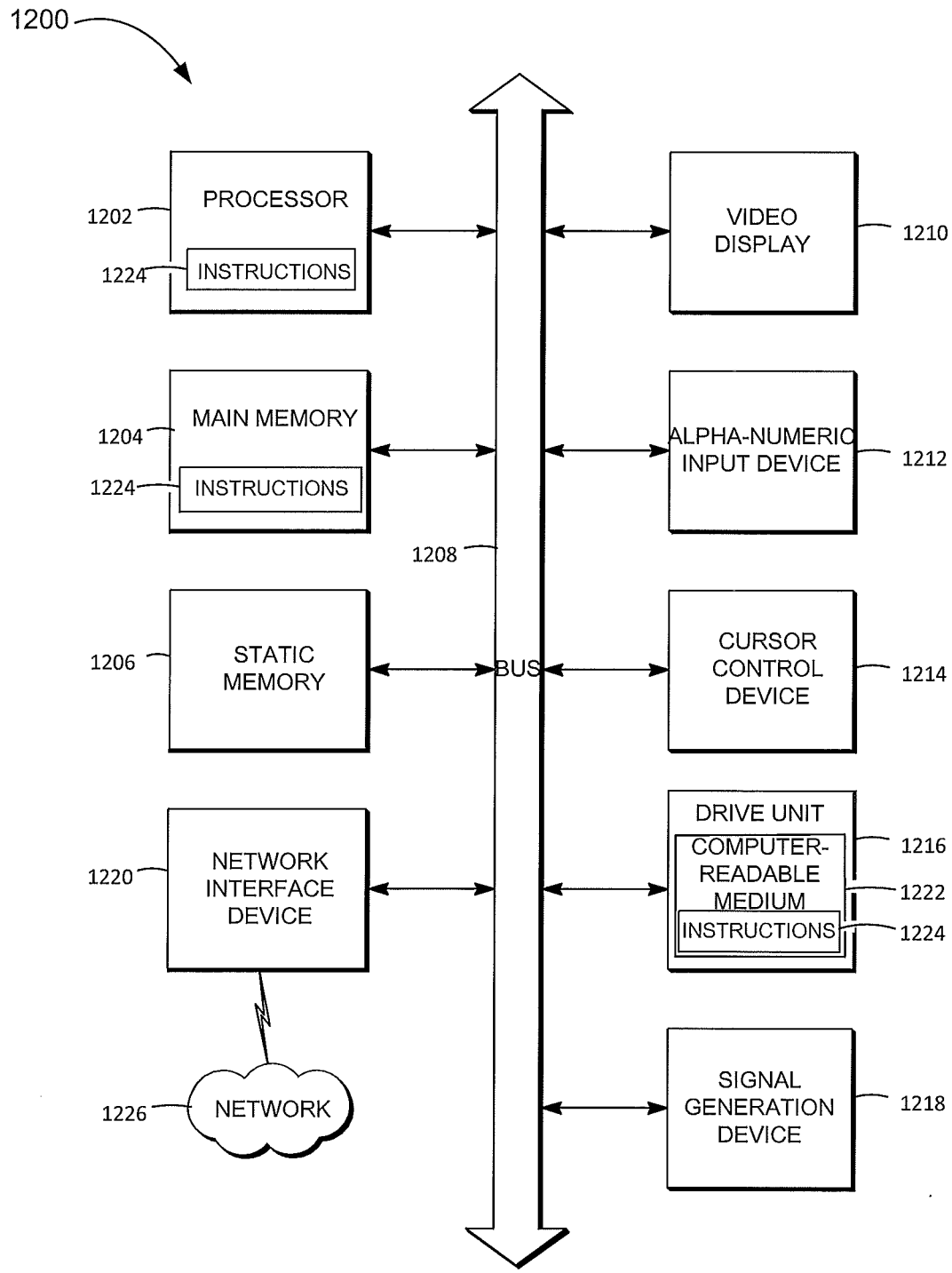
FIG. 12 is a block diagram of a machine in the example form of a computer system within which a set of instructions for causing the machine to perform any one or more of the methodologies discussed herein may be executed or stored.

FIG. 12 shows a block diagram of a machine in the example form of a computer system 1100 within which a set of instructions may be executed causing the machine to perform any one or more of the methods, processes, operations, or methodologies discussed herein. The order processing device 102, the network manager device 106, and/or the sorting device 110 may include the functionality of the one or more computer systems 1200.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a gaming device, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU) a graphics processing unit (GPU) or both), a main memory 1204 and a static memory 1206, which communicate with each other via a bus 1208. The computer system 1200 further includes a video display unit 1210 (e.g., a liquid crystal display (LCD) or a cathode ray tube (CRT)). The computer system 1200 also includes an alphanumeric input device 1212 (e.g., a keyboard), a cursor control device 1214 (e.g., a mouse), a drive unit 1216, a signal generation device 1218 (e.g., a speaker) and a network interface device 1220.

The drive unit 1216 includes a computer-readable medium 1222 on which is stored one or more sets of instructions (e.g., software 1224) embodying any one or more of the methodologies or functions described herein. The software 1224 may also reside, completely or at least partially, within the main memory 1204 and/or within the processor 1202 during execution thereof by the computer system 1200, the main memory 1204 and the processor 1202 also constituting computer-readable media.

The software 1224 may further be transmitted or received over a network 1226 via the network interface device 1220.

While the computer-readable medium 1222 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing or encoding a set of instructions for execution by the machine and that cause the machine to perform any one or more of the methodologies of the present invention. The term "computer-readable medium" shall accordingly be taken to include, but not be limited to, solid-state memories, and optical media, and magnetic media. In some embodiments, the computer-readable medium is a non-transitory computer-readable medium.

The term "based on" or using, as used herein, reflects an open-ended term that can reflect others elements beyond those explicitly recited.

Certain systems, apparatus, applications or processes are described herein as including a number of modules. A module may be a unit of distinct functionality that may be presented in software, hardware, or combinations thereof. When the functionality of a module is performed in any part through software, the module includes a computer-readable medium. The modules may be regarded as being communicatively coupled.

The inventive subject matter may be represented in a variety of different embodiments of which there are many possible permutations.

In an example embodiment, a system is provided with a wheel assembly, an entry portion, an exit portion, an attribute sensor unit and a control unit. The wheel assembly sorts multiple containers and has an inner guide member rotatable about a center axis and adapted to hold the containers. The entry portion is disposed proximal the wheel assembly for selectively allowing the containers to enter the wheel assembly. The exit portion is disposed proximal the wheel assembly for selectively allowing the containers to exit the wheel assembly. The attribute sensor unit acquires attributes of the container. The control unit commands movement of the wheel assembly, entry portion or exit portion based on the attributes of the containers acquired by the attribute sensor unit.

In an example embodiment, a container is released into a pocket section, with the pocket section being at a first alignment stage. The pocket section is rotated with the container away from the first alignment stage to a second alignment stage. Attributes of the container are acquired at the second alignment stage. An order to which the container belongs is identified with the acquired attributes. The pocket section with the container is rotated to a third alignment stage. The location of the third alignment stage is selected based on the identified order. The container is received to group with one or more containers in the identified order.

In an example embodiment, a container is released into a pocket section, with the pocket section being at a first alignment stage. The pocket section is rotated with the container away from the first alignment stage to a second alignment stage. Attributes of the container are acquired at the second alignment stage. The pocket section is identified and registered as having the container therein based on the acquired attributes. An expected state of the pocket section is compared with the state of the pocket section having the container. Flagging for a suspected error is based on an inconsistency with the expected state and the state of the pocket section. The pocket section with the container is rotated to a third alignment stage. The location of the third alignment stage is selected based on the inconsistency. The container is received to group with one or more containers.

Thus, methods and systems for sorting have been described. Although embodiments of the present invention have been described with reference to specific example embodiments, it will be evident that various modifications and changes may be made to these embodiments without departing from the broader spirit and scope of the embodiments of the invention. Accordingly, the specification and drawings are to be regarded in an illustrative rather than a restrictive sense.

The methods described herein do not have to be executed in the order described, or in any particular order. Moreover, various activities described with respect to the methods identified herein can be executed in serial or parallel fashion. Although "End" blocks are shown in the flowcharts, the methods may be performed continuously.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

The invention claimed is:

1. A method comprising:
    releasing a prescription container into a pocket section of a wheel assembly, the wheel assembly having an inner guide member rotatable about a center axis, the inner guide member including a plurality of pocket sections about its circumference, the pocket section being at a first alignment stage of rotation of the wheel assembly;
    rotating the wheel assembly such that the pocket section with the prescription container is rotated away from the first alignment stage to a second alignment stage of rotation of the wheel assembly;
    acquiring an attribute of the prescription container at the second alignment stage;
    identifying a prescription drug order to which the prescription container belongs based on the acquired attribute;
    rotating the wheel assembly such that the pocket section with the prescription container is rotated to a third alignment stage of rotation of the wheel assembly, a location of the third alignment stage being selected based on identification of the prescription drug order; and
    receiving the prescription container to group with an additional prescription container in the prescription drug order.

2. The method of claim 1, wherein releasing includes coordinating entry of the prescription container into the pocket section based on the location of the pocket section.

3. The method of claim 2, wherein coordinating includes opening and closing an entry gate.

4. The method of claim 1, wherein acquiring includes accessing information on a label of the prescription container.

5. The method of claim 4, wherein acquiring includes scanning the label.

6. The method of claim 4, wherein acquiring includes weighing the prescription container.

7. The method of claim 4, wherein acquiring includes rotating the prescription container relative the pocket section.

8. The method of claim 1, wherein rotating to the second alignment stage is less than 360°.

9. The method of claim 1, wherein the pocket section is an arc shaped notch in the wheel assembly adapted to receive the container.

10. The method of claim 1, wherein the container rests within, but is not firmly held within, the pocket section during rotation of the pocket section to the second alignment stage and the third alignment stage.

11. The method of claim 1, further comprising:
selectively permitting the prescription container to proceed through a gate mechanism to the pocket section via a conveyor mechanism.

12. The method of claim 11, further comprising:
detecting a container absence in the pocket section,
wherein the prescription container is permitted to proceed through the gate mechanism to the pocket section via the conveyor mechanism based on detection of the container absence.

13. The method of claim 1, further comprising:
orienting the prescription container while within the pocket section; and
reading a label of the prescription container based on orientation of the prescription container.

14. The method of claim 1, wherein the prescription container is filled with a prescription drug prescribed to a patient.

15. A method comprising:
releasing a container into a pocket section, the pocket section being at a first alignment stage;
rotating the pocket section with the container away from the first alignment stage to a second alignment stage;
acquiring an attribute of the container at the second alignment stage;
identifying the pocket section and registering the pocket section as having the container therein based on the acquired attribute;
comparing an expected state of the pocket section with a state of the pocket section having the container;
flagging for a suspected error based on an inconsistency with the expected state and the state of the pocket section;
rotating the pocket section with the container to a third alignment stage, a location of the third alignment stage being selected based on the inconsistency; and
receiving the container to group with an additional container.

16. The method of claim 15, further comprising:
identifying an order to which the container belongs with the acquired attribute; and
flagging a companion container in the identified order.

17. The method of claim 16, further comprising:
assigning a third alignment stage for the flagged companion container for grouping the order.

* * * * *